United States Patent [19]

Shimizu

[11] Patent Number: 5,323,808
[45] Date of Patent: Jun. 28, 1994

[54] REFRIGERANT CHARGE CONNECTING UNIT

[75] Inventor: Kenji Shimizu, Isesaki, Japan

[73] Assignee: Sanden Corporation, Isesaki, Japan

[21] Appl. No.: 76,850

[22] Filed: Jun. 15, 1993

[30] Foreign Application Priority Data

Jun. 15, 1992 [JP] Japan .............................. 4-040756[U]

[51] Int. Cl.[5] .............................................. F25B 45/00
[52] U.S. Cl. ...................................... 137/594; 62/292; 137/614.04
[58] Field of Search .......................... 251/149.1, 149.6; 62/292; 137/594, 595, 614.04

[56] References Cited

U.S. PATENT DOCUMENTS

| | | | |
|---|---|---|---|
| 1,664,909 | 4/1928 | Thomson | 62/292 X |
| 3,208,232 | 9/1965 | Madison et al. | 62/292 X |
| 3,570,534 | 3/1971 | Beavers | 137/594 |
| 4,753,268 | 6/1988 | Palau | 251/149.6 X |
| 5,056,560 | 10/1991 | De Martelaere | 137/614.04 |
| 5,080,132 | 1/1992 | Manz et al. | 62/292 X |
| 5,172,557 | 12/1992 | Hubbell | 62/292 X |
| 5,220,810 | 6/1993 | Keltner | 62/292 |

Primary Examiner—Stephen M. Hepperle
Attorney, Agent,, or Firm—Baker & Botts

[57] ABSTRACT

A refrigerant charge receptacle (25) is provided for interfacing between an air conditioning system (2) having a high-pressure pipe (241) and a low-pressure pipe (242) and a refrigerant charge apparatus, having a high-pressure charge valve (332a) and a low-pressure charge valve (332b), for charging the air conditioning system (2) with a refrigerant. The refrigerant charge receptacle (25) includes a receptacle block (251) having disposed within a high-pressure bore (251a) having the high-pressure pipe (241) attached thereto and a high-pressure opening (105b). Also disposed within the receptacle block (251) is a low-pressure bore (251b) having the low-pressure pipe (242) attached thereto and a low-pressure opening (106b). A high-pressure receptacle valve (252) is attached to the high-pressure opening (105b) for mating with and receiving a first flow of the refrigerant from the high-pressure charge valve (332a). A low-pressure receptacle valve (253) is attached to the low-pressure opening (106b) for mating with and receiving a second flow of the refrigerant from the low-pressure charge valve (332b).

15 Claims, 8 Drawing Sheets

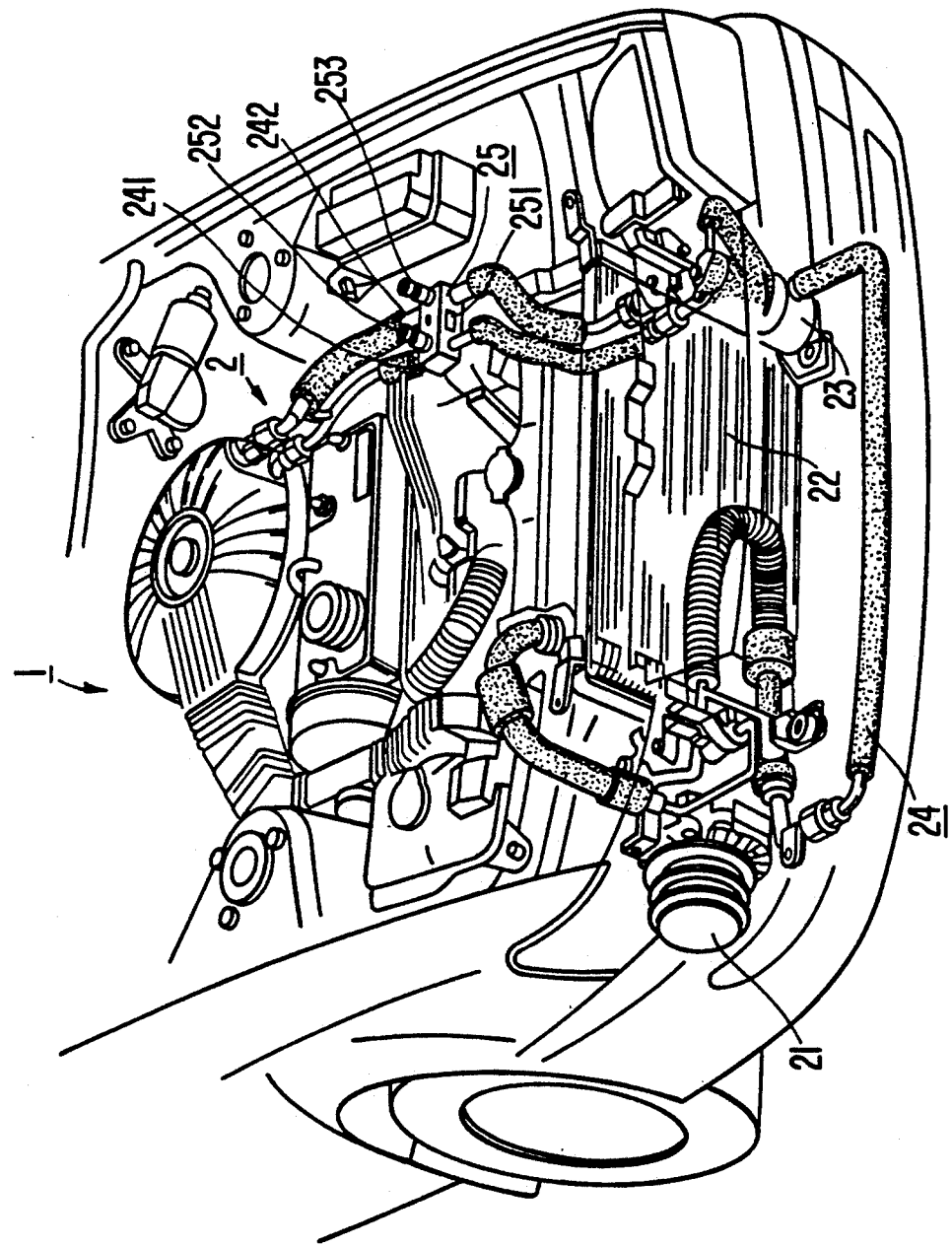

REFRIGERANT CHARGE CONNECTING UNIT

TECHNICAL FIELD OF THE INVENTION

This invention relates to a refrigerant charge connecting unit used with a refrigerant circuit of a refrigerant system, particularly used for a refrigerant circuit of an automotive air conditioning system when a refrigerant such as freon is charged into the refrigerant circuit from a refrigerant charging apparatus.

BACKGROUND OF THE INVENTION

A typical automotive air conditioning system is located in an automotive engine compartment 1 of an automobile as shown in FIG. 1. An automotive air conditioning system 2 comprises a compressor 21, a condenser 22, a receiver-dryer 23, an evaporator (not shown), and a plurality of pipes 24 connecting the aforementioned components to each other to form a sealed refrigerant circuit. A refrigerant (not shown), such as freon, is disposed within the sealed circuit.

Plurality of pipes 24 includes a high-pressure side pipe 241, disposed between receiver-dryer 23 and the evaporator, for passing the refrigerant therethrough at a high pressure. Plurality of pipes 24 also includes a low-pressure side pipe 242, disposed between the evaporator and compressor 21, for passing the refrigerant therethrough at a low pressure. Pipes 241 and 242 respectively include valves 241a and 242a.

As shown in FIG. 2, valves 241a and 242a allow the refrigerant circuit to be filled, i.e. "charged", with refrigerant. Charging of the circuit is performed by coupling one end 100 (FIG. 2) of a refrigerant charging apparatus to valves 241a and 242a. The other end (not shown) of the refrigerant charging apparatus is coupled to a container (not shown) which stores the refrigerant. The charging apparatus charges the refrigeration circuit with the refrigerant from the container until a proper level of refrigerant is disposed within the circuit. Valves 241a and 242a close to prevent leakage of refrigerant when end 100 is removed.

More specifically, the refrigerant charging apparatus provides a typical connecting structure 103 which includes hoses 31 and 32 extending therefrom. Valves 31a and 32a are respectively set at the ends of hoses 31 and 32. Valves 31a and 32a are covered by caps 101 and 102 respectively when the charging apparatus is not in use. To perform the charging operation, caps 101 and 102 are removed and valves 31a and 32a are respectively coupled to valves 241a and 242a. During the charging operation, the refrigerant flows from the refrigerant charging apparatus into the refrigerant circuit through hoses 31 and 32 and valves 31a, 32a, 241a and 242a.

One problem with connecting structure 103 is the fact that mating valve pair 31a-241a must be coupled separately from mating valve pair 32a-242a. That is, the valve pairs must be coupled at different times. This separate coupling procedure requires a relatively long time.

Another problem with connecting structure 103 is that either one or both of valve pairs 31a-241a and 32a-242a may not mate securely. This unsecured mating may allow refrigerant to leak into and damage the atmosphere. Such a leak may also cause the charging apparatus to erroneously indicate that the circuit has been charged with a proper level of refrigerant. Additionally, if one or both of the valve pairs becomes uncoupled, the charging process is delayed while the uncoupled pair or pairs is recoupled.

SUMMARY OF THE INVENTION

Accordingly, an object of this invention is to provide a refrigerant charge connecting structure which allows quick coupling of a plurality of refrigerant charging apparatus valves to a plurality of refrigerant circuit charging valves.

Another object of this invention is to provide a refrigerant charge connecting structure which can securely maintain the connection between a plurality of refrigerant charging plug valves and a plurality of refrigerant circuit receptacle valves when a refrigerant circuit is charged with a refrigerant such as freon gas.

Therefore, in accordance with the present invention, a refrigerant charge receptacle is provided for interfacing between an air conditioning system having a high-pressure pipe and a low-pressure pipe and a refrigerant charge apparatus, having a high-pressure charge valve and a low-pressure charge valve, for charging the air conditioning system with a refrigerant. The refrigerant charge receptacle includes a receptacle block having disposed within a high pressure bore having the high-pressure pipe attached thereto and a high-pressure opening. Also disposed within the receptacle block is a low-pressure bore having the low-pressure pipe attached thereto and a low-pressure opening. A high-pressure receptacle valve is attached to the high-pressure opening for mating with and receiving a first flow of the refrigerant from the high-pressure charge valve. A low-pressure receptacle valve is attached to the low-pressure opening for mating with and receiving a second flow of the refrigerant from the low-pressure charge valve.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a perspective view of an automotive engine compartment containing an air conditioning system having a refrigerant charge receptacle according to the present invention;

DETAILED DESCRIPTION OF THE INVENTION

Figure 1:
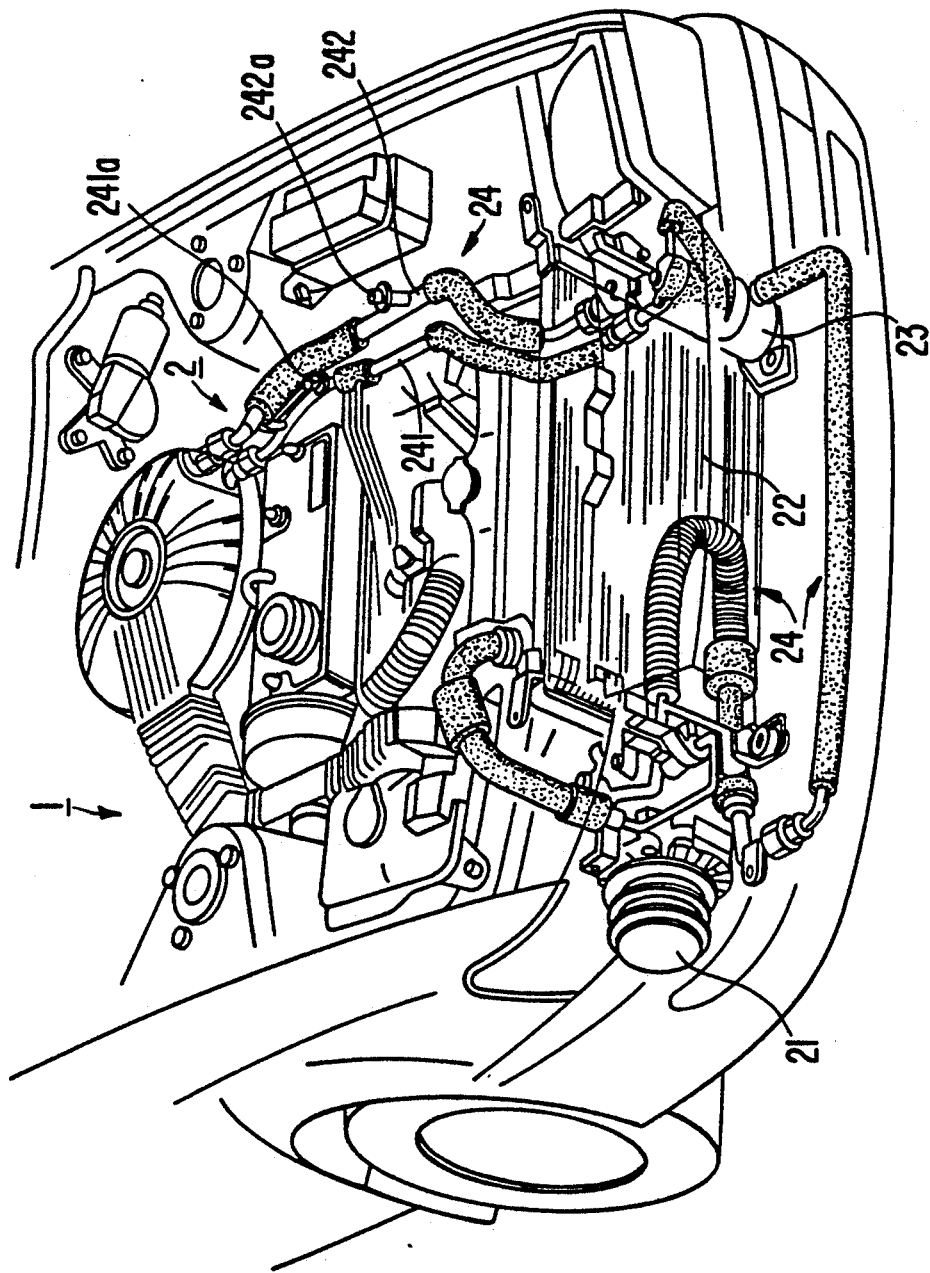
FIG. 1 is a perspective view of an automotive engine compartment containing an air conditioning system having refrigerant charge connector valves according to the prior art.
Figure 2:
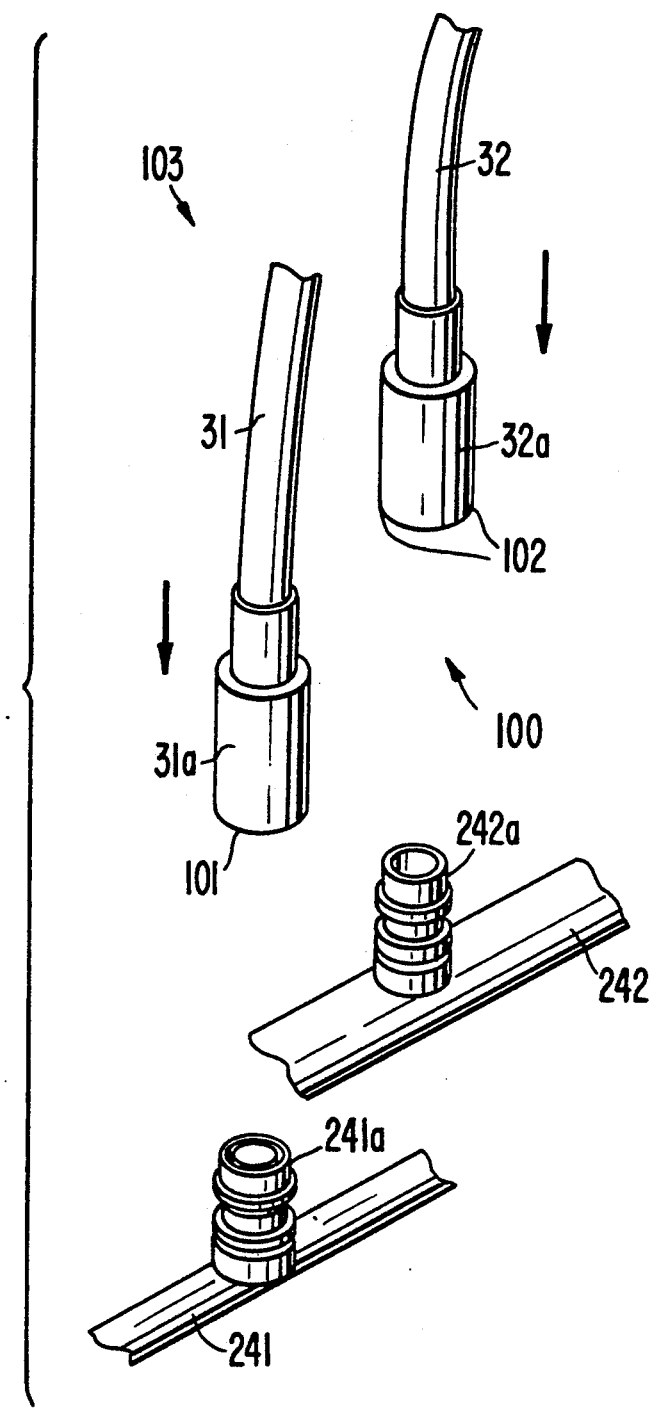
FIG. 2 is a perspective view of a refrigerant charge connecting structure according to the prior art.

The preferred embodiment of the present invention and its advantages are best understood by referring to FIGS. 3-8 of the drawings, like numerals being used for like and corresponding parts of the various drawings.

Referring to FIG. 3, an air conditioning system 2 located in an automotive engine compartment 1 comprises a compressor 21, a condenser 22, a receiver-dryer 23, an evaporator (not shown), and a plurality of pipes 24 connecting the aforementioned components to form a refrigerant circuit. Pipes 24 include a high-pressure side pipe 241, disposed between receiver-dryer 23 and the evaporator, for passing at a high pressure therethrough a refrigerant such as freon gas. Pipes 24 also include a low-pressure side pipe 242, disposed between compressor 21 and the evaporator, for passing at a low pressure therethrough the refrigerant. A refrigerant charge receptacle unit 25 is disposed within the paths of pipes 241 and 242. That is, the internal pathways of pipes 241 and 242 extend through respective bores of receptacle 25.

Figure 4A:
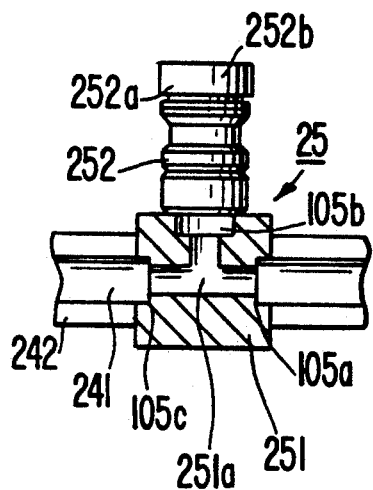
FIGS. 4A-4B are partial sectional views of the refrigerant charge receptacle of FIG. 3.
Figure 4B:
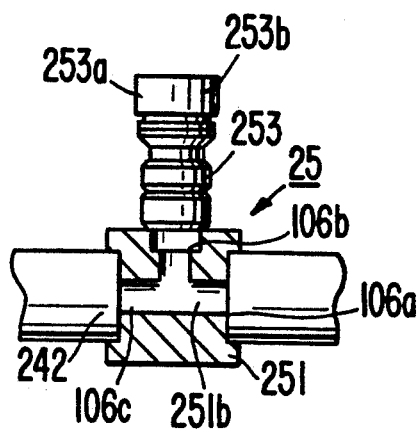

As shown in FIGS. 4A and 4B, charge receptacle unit 25 includes a T-fitting block 251 having two "T" shaped coupling bores 251a and 251b. High-pressure receptacle bore 251a has three high-pressure openings 105a-c, while low-pressure receptacle bore 251b has three low-pressure openings 106a-c. Charge receptacle unit 25 also includes high-pressure receptacle valve 252 and low-pressure receptacle valve 253 which allow refrigerant to be introduced into air conditioning system 2 (FIG. 3) via pipes 241 and 242.

Referring to FIG. 4A, a first portion of bore 251a is disposed between openings 105a and 105c. Pipe 241 is attached, typically by brazing, to openings 105a and 105c so that the first portion is contiguous with the internal passageway of pipe 241. A second portion of bore 251a is disposed between opening 105b and the first portion. (The first and second portions together form the shape of a "T".) Receptacle valve 252 is attached, typically by brazing, to opening 105b so that the second portion is contiguous with the interior (not shown) of valve 252. Thus, a refrigerant may flow through receptacle valve 252 to the interior of pipe 241 via bore 251a.

Referring to FIG. 4B, a first portion of bore 251b is disposed between openings 106a and 106c. Pipe 242 is attached, typically by brazing to openings 106a and 106c so that the first portion is contiguous with the internal passageway of pipe 242. A second portion of bore 251b is disposed between opening 106b and the first portion. (The first and second portions together form the shape of a "T".) Receptacle valve 253 is attached, typically by brazing, to opening 106b so that this second portion is contiguous with the interior (not shown) of valve 253. Thus, a refrigerant may flow through receptacle valve 253 to the interior of pipe 242 via bore 251b. Thus, refrigerant charge receptacle unit 25 interfaces air conditioning system 2 to the refrigerant charge apparatus.

Still referring to FIGS. 4A-B, a cap 252b is provided for covering an opening 252a of receptacle valve 252 when valve 252 is not in use, i.e., air conditioning system 2 (FIG. 3) is not being charged with refrigerant. Likewise, a cap 253b is provided for covering an opening 253a of valve 253. These caps 252b and 253b help to prevent the refrigerant from escaping from the refrigerant circuit, particularly when one or both of valves 252 and 253 malfunctions by leaking.

Figure 5:
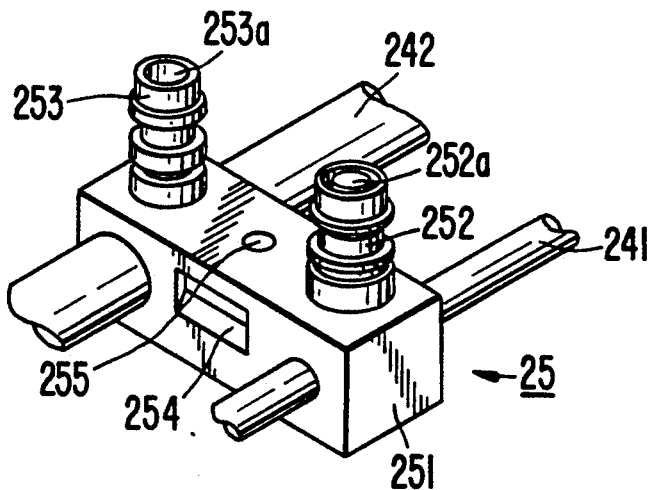
FIG. 5 is a perspective view of the refrigerant charge receptacle of FIG. 3.

FIG. 5 is a perspective view of refrigerant charge receptacle unit 25 of FIGS. 4A-B. T-fitting block 251 is shown to include a guide bar hole 255, typically disposed substantially equidistantly from and between valves 252 and 253, for receiving a guide bar 336. T-fitting block 251 also includes two identical latching notches 254 disposed as shown, each for receiving a pallet portion 333c of an arm 333a. Guide bar 336, pallet 333c and arm 333a are discussed in conjunction with FIGS. 6A-B.

Figure 6A:
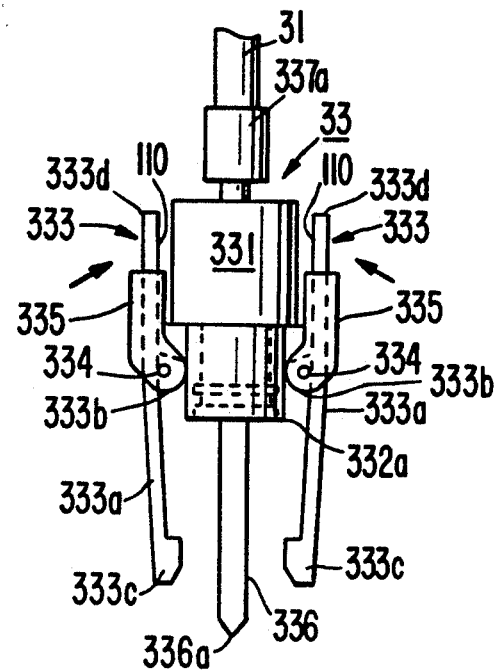
FIGS. 6A-B are a side view and a perspective view respectively of a refrigerant charge plug.
Figure 6B:
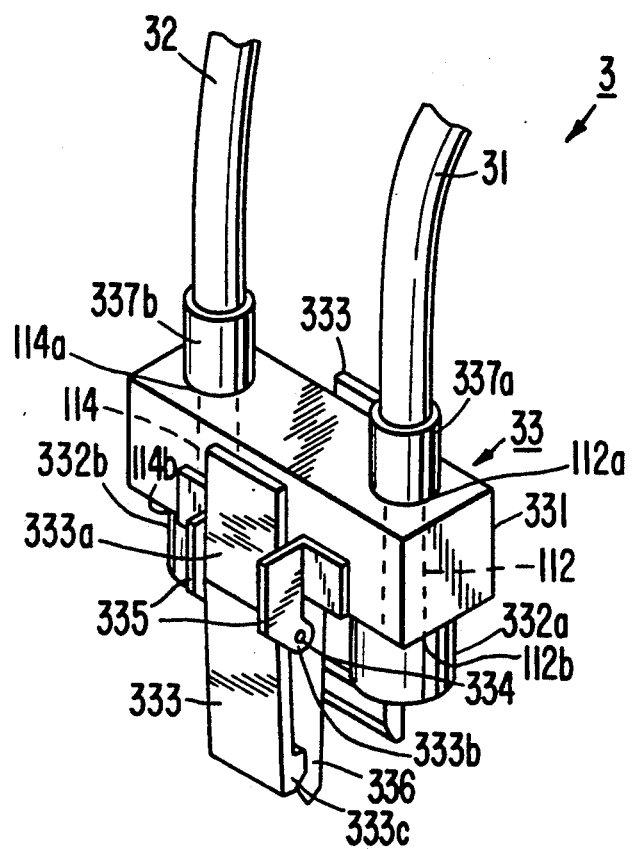

FIGS. 6A-B are side and perspective views respectively of a refrigerant charge plug unit 33. Plug unit 33 includes a plug block 331, plug valves 332a and 332b, identical latches 333, joints 337a and 337b, a guide bar 336, a high-pressure plug bore 112 and a low-pressure plug bore 114. Bore 112 has a joint opening 112a and a valve opening 112b. Bore 114 has a joint opening 114a and a valve opening 114b. Valve 332a is attached, typically by brazing, to valve opening 112b. Valve 332b is attached, typically by brazing, to valve opening 114b. Valves 332a and 332b project from plug block 331 as shown. Joint 337a is attached, typically by brazing, to joint opening 112a. Joint 337b is attached, typically by brazing, to joint opening 114a. Joints 337a and 337b project as shown from plug block 331 opposite valves 332a and 332b. Valve 332a is connected to joint 337a by bore 112, disposed within plug block 331, through which refrigerant may flow. Valve 332b is connected to joint 337b by bore 114, also disposed within plug block 331, through which refrigerant may flow. High-pressure tube 31 and low-pressure tube 32 are respectively coupled to joints 337a and 337b. Tubes 31 and 32 carry refrigerant from a container of a refrigerant charging apparatus (not shown) to charging plug 33 via joints 337a and 337b respectively.

Identical latches 333 are respectively set on the opposite sides of plug block 331, and extend in the same direction as and beyond valves 332a and 332b. Each latch 333 includes an arm member 333a, a support member 333b and a pallet member 333c. Each latch 333 is supported by a pin 334 disposed between a respective support member 335 so as to allow each latch 333 to pivot around pin 334. Each support 335 has attached thereto a spring member 110 which exerts a force against an end 333d of arm 333a. These respective forces exerted by each spring member 110 tend to urge each pallet 333c "inward", i.e. toward each other and guide bar 336. Pallets 333c are forced apart, i.e., in a direction away from each other and guide bar 336, by the exertion of a force, opposing and greater than the force exerted by spring members 110, on ends 333d of arm members 333a. The direction of this opposing force is illustrated by the arrows in FIG. 6A. Once the opposing force is removed, the spring force urges latches 333 back to their normal position as shown in FIG. 6A.

Guide bar 336 is attached to plug box 331 and is disposed substantially equidistantly and between plug valves 332a and 332b. In this embodiment of the present invention, guide bar 336 extends beyond pallets 333c and has a rounded end portion 336a.

Referring to FIGS. 7A-D, the operation of a refrigeration connecting unit 3, which includes refrigerant charge receptacle unit 25 and refrigerant charge plug unit 33, during a refrigerant charging procedure is described.

Caps 252b and 253b are first removed from valves 252 and 253. As shown in FIG. 7A, plug unit 33 is aligned with receptacle unit 25 such that guide bar 336 is aligned with guide bar hole 255, plug valve 332a is aligned with receptacle valve 252 and plug valve 332b is aligned with receptacle valve 253. This alignment is typically performed by a human operator. Plug valves 332a and 332b are structured so that they can properly mate only with receptacle valves 252 and 253 respectively. This structuring prevents receptacle unit 25 and plug unit 33 from being improperly coupled together.

Figure 7B:
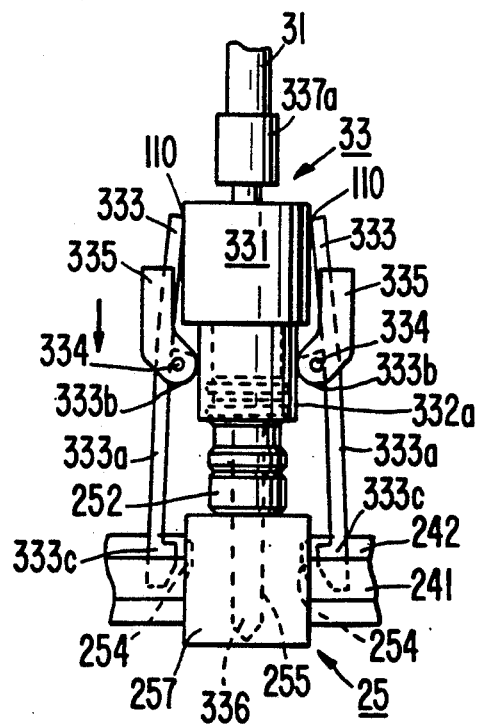
FIGS. 7A-D are a perspective, two side views and an elevational view respectively of a refrigerant charge connecting unit including the refrigerant charge receptacle of FIG. 3 and the refrigerant charge plug of FIGS. 6A-B.
Figure 7A:
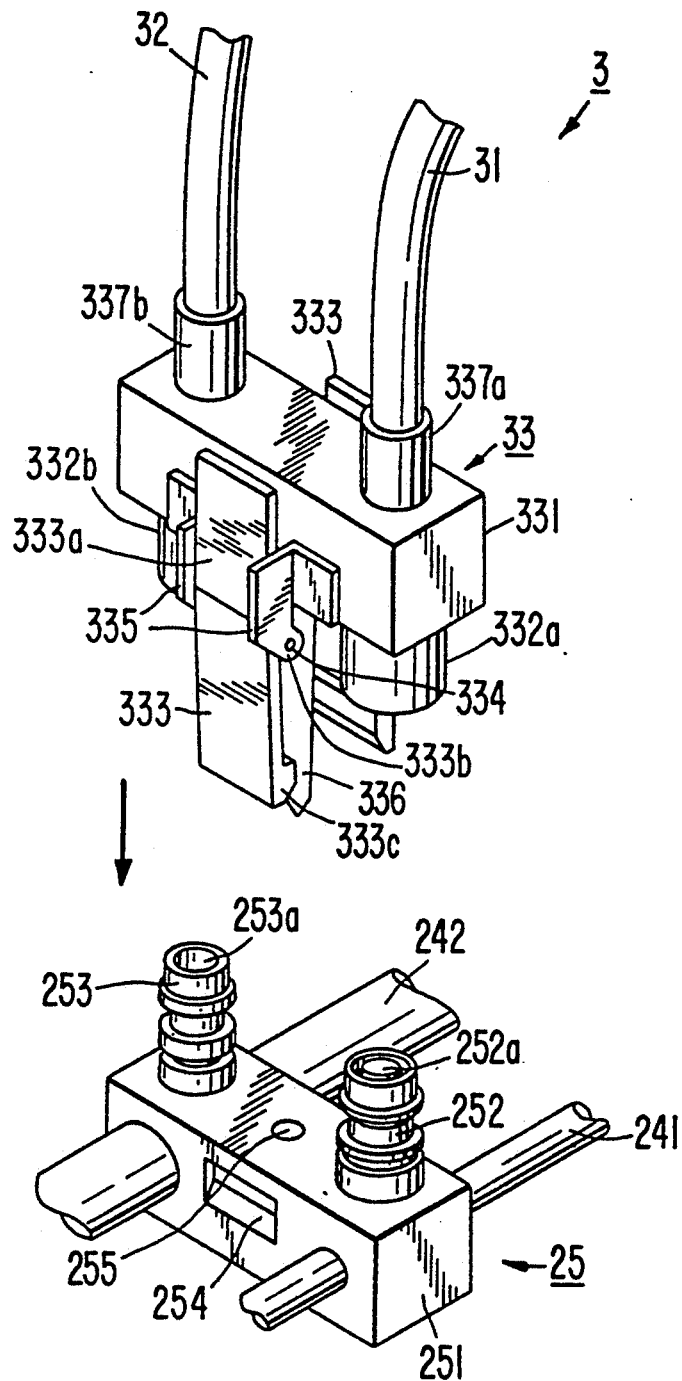

Referring to FIG. 7B, a force opposing the spring force generated by spring members 110 is applied to ends 333d of arms 333a. The application of the opposing force causes pallets 333c to spread apart. This opposing force is typically generated by the hand of an operator squeezing together ends 333d of arms 333a. Plug unit 33 is then urged toward receptacle unit 25, typically by the operator. Guide bar 336 enters into guide bar hole 255, valve 332a mates with valve 252, valve 332b mates with valve 253 and pallets 333c become adjacent to latching notches 254.

Figure 7C:
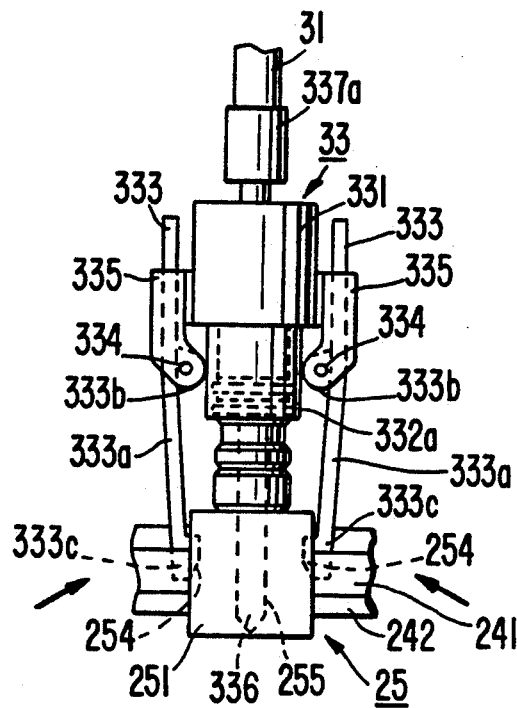
Figure 7D:
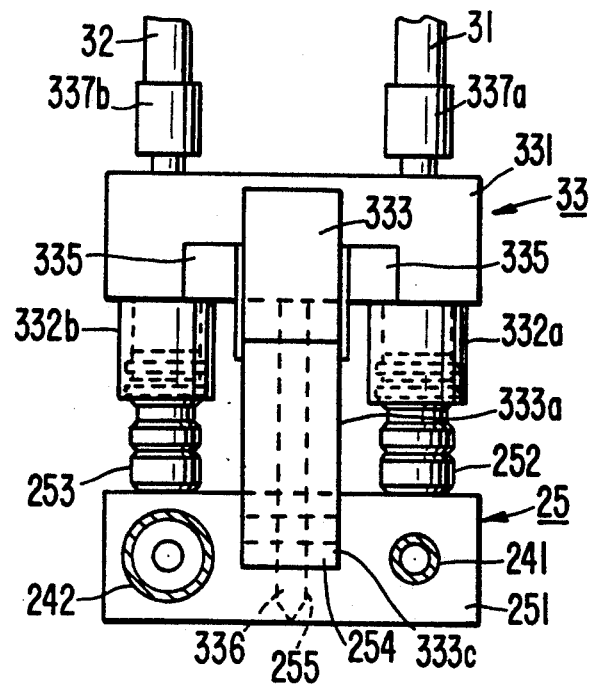

Referring to FIGS. 7C–D, the opposing force is withdrawn, i.e., the operator stops squeezing, allowing the spring force to cause each pallet 333c to mate with a respective latching notch 254. Latching notches 254 are contoured to snugly receive pallets 333c. The mating of pallets 333c with latching notches 254 prevents plug unit 33 from spontaneously uncoupling from receptacle unit 25.

The air conditioning system 2 (FIG. 3) is then charged with the refrigerant. The refrigerant flows from the refrigerant charging apparatus (not shown) into the refrigerant circuit through mated valve pairs 332a-252 and 332b-253. These valve pairs form a fluid barrier, i.e. a seal, which prevents refrigerant from entering into the atmosphere and atmosphere from entering into the refrigeration circuit. Thus, no leaks are present which may cause the charging apparatus to erroneously indicate that the refrigeration circuit has been charged with the proper level of refrigerant. Additionally, the mating of pallets 333c with latching notches 254 prevents mated valve pairs 332a-252 and 332b-253 respectively from spontaneously uncoupling.

When air conditioning system 2 has been charged with the proper level of refrigerant, the flow of refrigerant from the refrigeration charging apparatus is disabled. A force opposing the spring force is applied as described above, typically by squeezing, to force pallets 333c out from latching notches 254. Plug unit 33 is then pulled away from receptacle unit 25 in a direction opposite to that in which it was urged toward receptacle unit 25. This causes mated valve pairs 332a-252 and 332b-253 to respectively uncouple, and guide bar 336 to disengage from guide bar hole 255. The opposing force is then removed, i.e., the operator stops squeezing together ends 333d of arms 333a.

The above embodiment of refrigerant charge connecting unit 3 is used in conjunction with the refrigerant circuit of an automobile air conditioning system. However, the refrigerant charge connecting unit according to the present invention can be used for the refrigerant circuit of other types of refrigeration systems as well.

Although the present invention and its advantages have been described in detail, it should be understood that various changes, substitutions and alterations can be made therein without departing from the spirit and scope of the invention as defined by the appended claims.

What is claimed is:

1. A refrigerant charge receptacle for interfacing between an air conditioning system having a high-pressure pipe and a low-pressure pipe and a refrigerant charge apparatus, having a high-pressure charge valve and a low-pressure charge valve, for charging the air conditioning system with a refrigerant, the refrigerant charge receptacle comprising:
   a receptacle block having disposed within a high pressure bore having the high-pressure pipe attached thereto and a low-pressure bore having the low-pressure pipe attached thereto, said high-pressure bore having a high-pressure opening and said low-pressure bore having a low-pressure opening;
   a high-pressure receptacle valve attached to said high-pressure opening for mating with and receiving a first flow of a refrigerant from the high-pressure charge valve; and
   a low-pressure receptacle valve attached to said low pressure opening for mating with and receiving a second flow of said refrigerant from the low-pressure charge valve.

2. The refrigerant charge receptacle of claim 1 wherein said receptacle block further comprises a guide bar hole for aligning the high-pressure charge valve with said high-pressure receptacle valve and the low-pressure charge valve with said low-pressure receptacle valve.

3. The refrigerant charge receptacle of claim 1 wherein said receptacle block further comprises a latching notch for securing the high-pressure charge valve to said high-pressure receptacle valve and the low-pressure charge valve to said low-pressure receptacle valve.

4. The refrigerant charge receptacle of claim 1 wherein said high-pressure receptacle valve further comprising structure for mating only with the high-pressure charge valve.

5. The refrigerant charge receptacle of claim 1 wherein said low-pressure receptacle valve further comprising structure for mating only with the low-pressure charge valve.

6. The refrigerant charge receptacle of claim 1 further comprising:
   a first cap for covering said high-pressure receptacle valve; and
   a second cap for covering said low-pressure receptacle valve.

7. A refrigerant charge plug for interfacing between a refrigerant charge apparatus, having a high-pressure hose and a low-pressure hose, for charging an air conditioning system with a refrigerant and an air conditioning system having a low-pressure receptacle valve and a high-pressure receptacle valve, said refrigerant charge plug comprising:
   a plug block having a high-pressure bore and a low-pressure bore both for carrying the refrigerant therethrough;
   a high-pressure joint, attached to a joint end of said high-pressure bore, for mating with the high-pressure hose;
   a low-pressure joint, attached to a joint end of said low-pressure bore, for mating with the low-pressure hose;
   a high-pressure plug valve, attached to a valve end of said high-pressure bore, for mating with said high-pressure receptacle valve; and
   a low-pressure plug valve, attached to a valve end of said low-pressure bore, for mating with said low-pressure receptacle valve.

8. The refrigerant charge plug of claim 7 further comprising a guide bar for aligning the high-pressure receptacle valve with said high-pressure plug valve and the low-pressure receptacle valve with said low-pressure plug valve.

9. The refrigerant charge plug of claim 7 wherein said high-pressure plug valve further comprising structure for mating only with said high-pressure receptacle valve.

10. The refrigerant charge plug of claim 7 further comprising:
   a latch having a pallet member disposed at a pallet end;
   a support member attached to said plug block for supporting said latch;
   a pin for pivotally attaching said latch to said support member; and
   a spring member, coupled between said support member and said latch, for forcing said pallet end toward said plug block.

11. A refrigerant connecting unit for interfacing between an air conditioning system having a high-pressure pipe and a low-pressure pipe and a refrigerant charging apparatus, having a high-pressure hose and a low-pressure hose, for charging the air conditioning system with a refrigerant, the refrigerant connecting unit comprising:
   a refrigerant charge receptacle comprising,
      a receptacle block having disposed within a high-pressure receptacle bore having the high-pressure pipe brazed thereto and a low-pressure receptacle bore having the low-pressure pipe brazed thereto, said high-pressure receptacle bore having a high-pressure opening and said low-pressure receptacle bore having a low-pressure opening,
      a high-pressure receptacle valve brazed to said high-pressure opening, and
      a low-pressure receptacle valve brazed to said low pressure opening; and
   a refrigerant charge plug comprising,
      a plug block having a high-pressure plug bore and a low-pressure plug bore both for carrying the refrigerant therethrough,
      a high-pressure joint, brazed to a joint end of said high-pressure plug bore, for mating with the high-pressure hose,
      a low-pressure joint, brazed to a joint end of said low-pressure plug bore, for mating with the low-pressure hose,
      a high-pressure plug valve, brazed to a valve end of said high-pressure plug bore, for mating with said high-pressure receptacle valve, and
      a low-pressure plug valve, brazed to a valve end of said low-pressure plug bore, for mating with said low-pressure receptacle valve.

12. The refrigerant connecting unit of claim 11 wherein said charge plug further comprises a guide bar disposed between said high-pressure and said low-pressure plug valves, and
   wherein said charge receptacle further comprises a guide bar hole disposed between said high-pressure and said low-pressure receptacle valves, said guide bar for mating with said guide bar hole to align said high-pressure plug valve with said high-pressure receptacle valve and said low-pressure plug valve with said low-pressure receptacle valve.

13. The refrigerant connecting unit of claim 11 wherein said charge plug further comprises,
   a latch having a pallet member disposed at a pallet end,
   a support member attached to said plug block for supporting said latch,
   a pin for pivotally attaching said latch to said support member, and
   a spring member, coupled between said support member and said latch, for forcing said pallet end toward said plug block, and wherein said charge receptacle further comprises,
   a latching notch for engaging said pallet member to secure said charge plug to said charge receptacle.

14. The refrigerant connecting unit of claim 11 wherein said high-pressure receptacle valve further comprising structure for mating with only said high-pressure plug valve.

15. The refrigerant connecting unit of claim 11 wherein said low-pressure plug valve further comprising structure for mating with only said low-pressure receptacle valve.

* * * * *